May 2, 1950      W. A. REX      2,506,317
REMOVAL OF HEAT FROM FINELY-DIVIDED SOLIDS
Filed Feb. 15, 1947
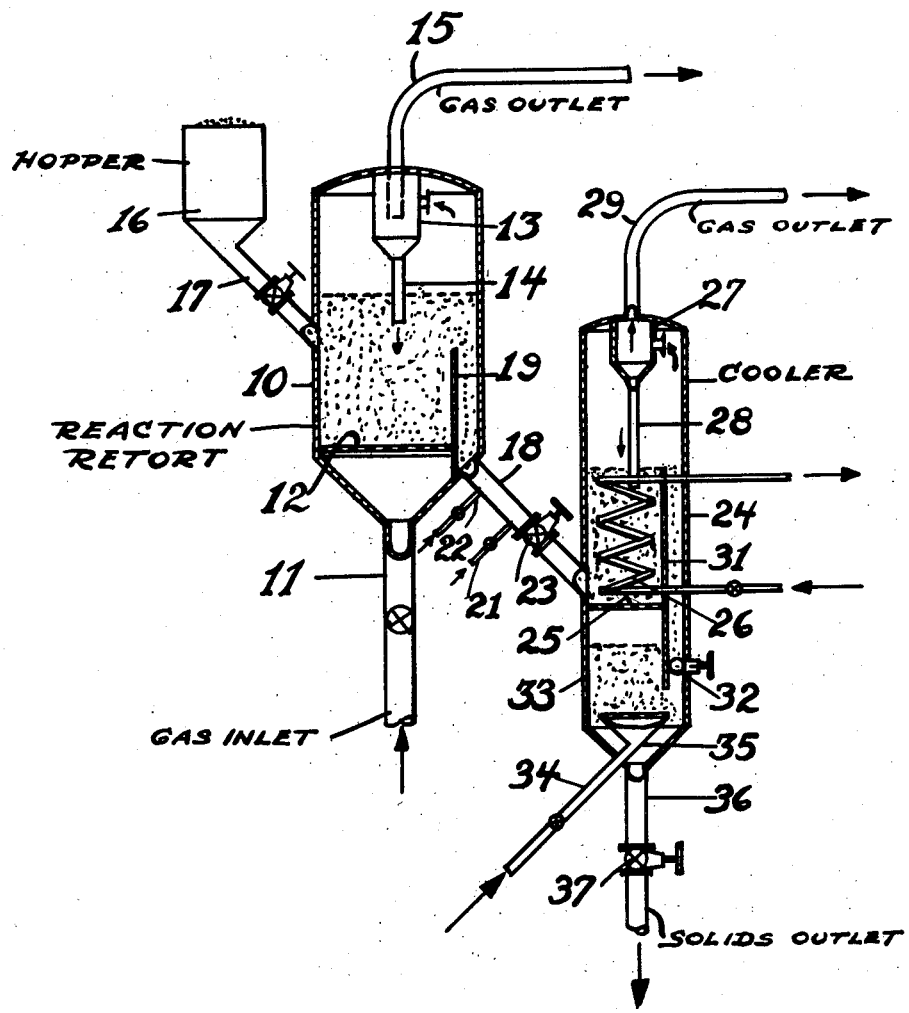
Walter A. Rex Inventor
By R. J. Whelan Attorney Patented May 2, 1950

2,506,317

UNITED STATES PATENT OFFICE 2,506,317

REMOVAL OF HEAT FROM FINELY-DIVIDED SOLIDS

Walter A. Rex, Westfield, N. J., assignor to Standard Oil Development Company, a corporation of Delaware Application February 15, 1947, Serial No. 728,929

4 Claims. (Cl. 62—170)

This invention relates to the removal of heat from finely-divided solids and pertains more particularly to an improved method of and apparatus for extracting heat from finely-divided solids resulting from high temperature chemical operations.

The invention finds application in various types of processes wherein it is desirable to cool finely-divided solids from a relatively high temperature to a lower temperature level. For example, in the distillation of oil shale, a carbonaceous shale residue is obtained. The retort in which the distillation is carried out may be at a temperature of the order of from 800° F. to 1000° F. Before exposing the carbonaceous residue to the atmosphere, it is necessary to cool the residue below the ignition temperature in order to avoid spontaneous ignition of the residue. In various other operations, such as in the calcination of carbonate and sulfide ores and in the reduction of other types of ores, economy dictates the recovery of heat from the hot, treated ore.

One of the principal objects of the invention is to provide a simple and more economic method of extracting heat from high temperature, finely-divided solids.

A more specific and detailed object of the invention is to provide a more simple and rapid method of recovering high-grade heat from hot, finely-divided solids.

Another object of the invention is to provide an improved apparatus for extracting high-grade heat from the hot, finely-divided solids.

Other more specific objects and advantages will be apparent from the more detailed description hereinafter in which reference will be made to the accompanying drawing. This drawing is a partly diagrammatic and partly schematic illustration of an apparatus forming a part of the invention and capable of carrying out other process phases of the invention.

Referring to the drawing, reference character 10 designates a vessel or reaction retort in which finely-divided solids are treated under relatively high temperature conditions, such as of the order of from 800° F. to 1000° F. or more. This retort may be of any conventional design. For illustrative purposes, the retort is shown in the form of an enlarged vertical vessel in which a body of finely-divided solids is adapted to be maintained in a fluidized, pseudo-liquid state. For illustrative purposes, the invention will be described as applied specifically to the distillation of shale, it being understood that the invention in its more specific phases has a more general application, as previously stated.

The retort 10 is provided with a body or layer of finely-divided shale. The gases serving to assist in the distillation of the shale are introduced into the bottom portion of the retort 10 through an inlet conduit 11. The bottom section of the retort 10 is provided with a horizontal perforated grid 12 through which the inlet gases pass upwardly into the main body of the retort containing the finely-divided solids. The velocity of the gases passing through the individual apertures of the grid is sufficient to prevent sifting or passing of the powder backwardly into the gas inlet 11. To this end, the total area of the openings in the grid may be one-fourth or less the total cross-sectional area of the retort.

The gases after passing through the grid 12 come in contact with the finely-divided shale undergoing distillation. The cross-sectional area of the retort 12 is so designed that the velocity of the gases passing upwardly through the retort is such as to lift the particles of shale and form a relatively dense, turbulent, fluid mixture of gases and shale in the lower section of the retort 10, as shown. Under properly controlled conditions a layer of mobile, turbulent, fluidized solids is maintained in the bottom section of the retort having the general appearance of a violently boiling liquid. The extreme turbulence of the particles in the retort results in a substantially uniform temperature throughout the length and breadth of the layer.

The gases, together with the volatile constituents of the shale, issue from the top of the layer and are passed into a suitable separating device, such as a cyclone separator 13, in which entrained powder carried upwardly by the gas stream is separated from the gaseous products. The entrained powder so separated is discharged backwardly into the fluid layer through a conduit 14 connected to the base of the cyclone. The gaseous products issue from the top of the retort 10 through conduit 15 and may be passed to other suitable dust and heat recovery equipment and subjected to any further fractionation and separation as may be required.

Fresh subdivided shale contained in hopper 16 may be discharged either continuously or intermittently into the retort 10 below the layer of fluidized solids through line 17 having a suitable control valve for adjusting the rate of flow therein. The hopper 16 may be in the form of a conventional lock hopper or double-bell hopper which provides a seal and prevents gases from the retort discharging through the hopper. The shale may also be introduced into the retort 10 through a conventional screw conveyor which may be either in the form of a compression screw or a non-compression conveyor screw.

The shale is maintained in the retort 10 for a period sufficient to distill the volatile content thereof. A stream of hot, carbonaceous residue at substantially the temperature of the retort is withdrawn from the retort 10 through a conduit 18. The outlet conduit 18 may be connected to a well in the retort 10 formed by a vertical wall 19 uniting with the outer wall of the retort 10 to form a pocket or well in which the spent residue may collect.

A suitable aerating gas may be introduced into the conduit 18 at one or more spaced points through lines 21 and 22 to maintain the finely divided solids in the conduit in a free flowing fluidized state capable of generating a hydrostatic pressure. The amount of gas introduced at these points is considerably less than the amount passing into the main body of the retort, and the density of the finely-divided shale in the conduit 18 and in the well communicating therewith is substantially greater than the density of the gas-shale mixture in the main body of the retort.

The stream of fluidized spent shale discharges from the conduit 18 through a control valve 23 into the upper portion of a cooling vessel 24. The cooling vessel 24 is provided at an intermediate point below the point of discharge of the spent shale with a perforated grid 25 through which vapors formed as hereinafter described pass upwardly through the upper portion of the cooling vessel at a rate adjusted to maintain a fluidized layer of spent shale undergoing cooling in the upper portion of the cooler 24 above the perforated grid 25. Cooling tubes 26 or other cooling elements are immersed in the bed of fluidized solids in the upper portion of the cooler 26 and serve to extract heat from the spent carbonaceous shale. The relatively dense fluidized phase of hot shale in the upper portion of the cooler 24 allows a high heat transfer rate, permitting rapid conductance of the heat from the powdered residue. As a result, high-grade heat, or, in other words, heat at a very high temperature level, may be rapidly recovered from the spent, hot, finely-divided solids discharged into the cooler. The vapors, after passing through the fluidized layer of solids in the upper portion of the cooler 24, pass into a cyclone separator 27 or other separating device for separating entrained powder from the gas. The powder so separated is returned to the bed of solids through conduit 28 in a manner similar to that described with respect to the conduit 14 leading from the cyclone 13 of the retort 10. The gases or vapors after passing through cyclone 27 are removed from the cooler 28 through line 29 and may be passed to other dust and heat recovery equipment (not shown). The finely-divided solids, after being subjected to partial cooling in the upper portion of the cooler 24 above the grid 25, overflow through a downcomer or vertical conduit 31 positioned in the cooler and discharged into the bottom portion of the cooler 24 in which the final cooling is obtained. The conduit 31 may be provided with a suitable valve 32 for regulating the rate of flow of the powder from the upper portion of the cooler and indirectly to control the level of the powder above the grid. Final cooling of the powder is obtained in the bottom portion 33 of the cooler 24 by injecting through line 34 a suitable vaporizable liquid such as water into the powder while the powder is maintained above the vaporization point of the liquid. The liquid may be discharged into the bottom of the cooler 24 through a suitable cone distributor 35 or through a multiplicity of nozzles so as to distribute the liquid uniformly over the full cross-sectional area of the vessel.

The liquid upon being injected into the relatively hot powder is vaporized and the vapors pass upwardly through the bottom portion 33 of the cooler at a velocity adjusted to again form a relatively dense, fluid layer of solids in the bottom portion of the cooler. The vapors after passing through the lower portion of the cooler 24 continue upwardly through the grid 25 and serve to fluidize the powder above the grid, as previously described. The relatively cool powder is finally withdrawn from the bottom portion of the cooler 24 through a conduit 36 having a control valve 37 for adjusting and controlling the level of the layer of fluidized solids in the bottom portion of the cooler 24.

From the foregoing it will be seen that the hot, finely-divided powder withdrawn from the retort 10 is subjected to a two-stage cooling treatment so that a substantial portion of the heat recovered is a a relatively high temperature level. The cooling is also effected while the powder is maintained in a relatively fluid state so that an extremely rapid transfer of heat from the powder to the heat transfer medium may be obtained. In carrying out the process, the final cooling of the powder is obtained by the injection of a vaporizable liquid and the vapors formed from the liquid serve to maintain the powder in the relatively dense fluid state previously described. As a result, it is unnecessary to provide extraneous gas for maintaining the powder in the fluidized state within the cooler. When carrying out the distillation of shale, the shale residue may be cooled in the upper portion of the cooler 24 from a temperature of from 800° F. to 1000° F. down to a temperature of from 400° F. to 600° F. and the final cooling of the powder down to a temperature of the order of from 250° F. to 300° F. may be effected by the injection of a vaporizable liquid such as water into the bottom portion of the cooler.

While the invention has been described with specific reference to the distillation of shales, it will be apparent that it has application in many other operations in which it is desired to cool hot, finely-divided solids.

I claim:

1. A method of cooling hot, subdivided solids which comprises passing a stream of said solids into an enlarged zone, wherein they are maintained in a fluidized state, extracting heat from said solids contained in said zone to reduce the temperature thereof to a lower intermediate temperature, removing a stream of the cooler solids from said zone, passing said solids so removed into a second cooling zone, injecting a vaporizable liquid into said second cooling zone while the solids contained in said zone are above the vaporization temperature of the liquid whereby the liquid is vaporized and the said solids are thereby further cooled, removing vapors from said second-named cooling zone and introducing the vapors so removed into the lower portion of said first-named cooling zone as a fluidizing medium therefor, and withdrawing the cooled, finely-divided products from said second-named cooling zone.

2. A method of cooling hot, subdivided solids which comprises passing a stream of said solids into an enlarged zone, passing vapors produced as hereinafter set forth upwardly through said zone at a rate controlled to maintain a relatively dense, turbulent, fluidized mass of solids in said zone, passing a cooling fluid in indirect heat exchange with the solids in said zone to reduce the temperature of said solids, removing a stream of said cooler solids from said zone, passing the solids so removed into a second enlarged zone, injecting a liquid vaporizable at the temperature of the solids in said second zone into the lower portion thereof whereby said liquid is vaporized and the solids are further cooled, removing vapors from the top of said second zone, adjusting the amount of vaporizable liquid introduced into said second zone to form a relatively dense, fluid layer of finely-divided solids therein, introducing vapors from said second-named zone into the lower portion of said first-named zone as the fluidizing medium therefor, and withdrawing cooled products from said second zone.

3. A method of cooling hot, finely-divided solids which comprises passing a stream of said solids into the bottom portion of an enlarged cooling zone, passing dispersed streams of vapors formed as hereinafter set forth upwardly through said zone at a rate adjusted to fluidize said solids and maintain them in a relatively dense, mobile, turbulent state, passing a cooling fluid in indirect heat exchange with said relatively dense, fluidized solids to extract heat rapidly therefrom and cool said solids to a lower intermediate temperature, discharging solids downwardly from the upper portion of said zone into a second zone positioned below said first-named zone, injecting a vaporizable cooling liquid into the bottom portion of said second-named zone while said zone is at a temperature sufficient to vaporize said liquid, removing vapors from said second zone and passing the vapors so removed upwardly through said upper zone as a fluidizing medium therefor, and withdrawing cooled, finely-divided products from said second-named zone.

4. A method of cooling hot, finely-divided solids which comprises passing a stream of said solids into a first enlarged zone, wherein said solids are maintained in a relatively dense, fluid, turbulent layer of solids in said zone, passing a cooling fluid in indirect heat exchange with the solids to extract a portion of the heat therefrom and reduce said solids to a lower intermediate temperature, withdrawing a downwardly moving stream of cooled solids from the upper portion of said first enlarged zone and discharging the solids so removed into the bottom portion of a second enlarged zone, injecting a vaporizable liquid into the bottom portion of said second enlarged zone while said zone is at a temperature sufficient to vaporize said liquid, adjusting the rate of introduction of said vaporizable liquid to form a relatively dense, fluidized layer of said solids in said second enlarged zone, withdrawing vapors from the upper portion of said second enlarged zone, passing the vapors so removed into the bottom portion of said first-named zone wherein they flow upwardly at a rate adapted to form the said relatively dense, fluid, turbulent layer of solids, and withdrawing cooled products from said second-named zone.

WALTER A. REX.

REFERENCES CITED

The following references are of record in the file of this patent:

UNITED STATES PATENTS

| Number | Name | Date |
|---|---|---|
| 2,374,660 | Belchetz et al. | May 1, 1945 |
| 2,419,245 | Arveson | Apr. 22, 1947 |
| 2,429,721 | Jahnig | Oct. 28, 1947 |
| 2,444,990 | Hemminger | July 13, 1948 |